United States Patent
Darraba et al.

(10) Patent No.: US 9,561,767 B2
(45) Date of Patent: Feb. 7, 2017

(54) DRIVE ARRANGEMENT FOR DRIVING A VEHICLE SAFETY DEVICE

(75) Inventors: Roger Darraba, Montesson (FR); Vincent Flouriot, Guiscriff (FR)

(73) Assignee: AUTOLIV DEVELOPMENT AB, Vargarda (SE)

( * ) Notice: Subject to any disclaimer, the term of this patent is extended or adjusted under 35 U.S.C. 154(b) by 67 days.

(21) Appl. No.: 14/422,537

(22) PCT Filed: Aug. 21, 2012

(86) PCT No.: PCT/GB2012/052044
§ 371 (c)(1),
(2), (4) Date: Apr. 30, 2015

(87) PCT Pub. No.: WO2014/029952
PCT Pub. Date: Feb. 27, 2014

(65) Prior Publication Data
US 2015/0224950 A1   Aug. 13, 2015

(51) Int. Cl.
*B60R 22/00* (2006.01)
*E05F 15/00* (2015.01)
(Continued)

(52) U.S. Cl.
CPC ............. *B60R 21/01* (2013.01); *B60R 21/017* (2013.01); *B60R 2021/01013* (2013.01);
(Continued)

(58) Field of Classification Search
CPC ............ B60R 21/01; B60R 2021/01286; B60R 2021/01013; B60R 2021/01184; B60R 2021/0119; B60R 21/017; B60R 2021/01027
(Continued)

(56) References Cited

U.S. PATENT DOCUMENTS 4,958,851 A * 9/1990 Behr ................... B60R 21/0176
                                                180/282
5,155,376 A * 10/1992 Okano ................. G01R 31/007
                                                280/735
(Continued)

FOREIGN PATENT DOCUMENTS

DE    10 2008 003 7    7/2009
EP    0 684 163 A2    5/1996
EP    1 953 044 A1    8/2008

OTHER PUBLICATIONS

PCT International Search Report—May 8, 2013.

*Primary Examiner* — Jaime Figueroa
(74) *Attorney, Agent, or Firm* — Brinks Gilson & Lione

(57) ABSTRACT

A drive arrangement (1) for driving a vehicle safety device (18) incorporates an input (2) which is connected to an output (9) of an electronic control unit (5). The output (9) of the electronic control unit (5) is an output which is operable to provide a firing signal to activate a pyrotechnic squib in a safety device, such as an airbag module. The drive arrangement (1) incorporates first and second analyzers (14, 15) which perform first and second algorithms on a firing signal provided by the electronic control unit (5) to determine that the firing signal would have activated a pyrotechnic squib. The drive arrangement (1) provides an output signal to a safety device (18) if both the first and second analyzers (14, 15) determine that the firing signal would have activated the pyrotechnic squib.

17 Claims, 7 Drawing Sheets

(51) Int. Cl.
*G05D 1/00* (2006.01)
*G05D 3/00* (2006.01)
*G06F 7/00* (2006.01)
*G06F 17/00* (2006.01)
*B60R 21/01* (2006.01)
*B60R 21/017* (2006.01)

(52) U.S. Cl.
CPC .............. *B60R 2021/0119* (2013.01); *B60R 2021/01027* (2013.01); *B60R 2021/01184* (2013.01); *B60R 2021/01286* (2013.01)

(58) Field of Classification Search
USPC ........................................ 701/1, 47
See application file for complete search history.

(56) References Cited

U.S. PATENT DOCUMENTS

| | | | | |
|---|---|---|---|---|
| 5,181,011 A * | 1/1993 | Okano | ............... | B60R 21/0173 180/282 |
| 5,204,547 A | 4/1993 | Schumacher et al. | | |
| 5,283,472 A * | 2/1994 | Takeuchi | ............ | B60R 21/0132 180/282 |
| 5,309,030 A * | 5/1994 | Schultz | ................... | H02J 9/061 280/735 |
| 5,475,269 A * | 12/1995 | Takeuchi | ............ | B60R 21/0173 180/282 |
| 5,596,497 A | 1/1997 | Honda | | |
| 5,608,269 A * | 3/1997 | Fendt | .................... | B60R 21/017 180/282 |
| 5,903,062 A * | 5/1999 | Mattes | .................. | B60R 21/017 180/282 |
| 5,977,651 A | 11/1999 | Ueda et al. | | |
| 5,977,653 A * | 11/1999 | Schmid | ............... | B60R 16/0315 180/282 |
| 6,052,634 A * | 4/2000 | Pathe | .................... | B60K 28/14 180/274 |
| 6,133,647 A * | 10/2000 | Ammler | .................. | B60R 21/01 307/10.1 |
| 6,220,628 B1 * | 4/2001 | Konja | ................... | B60R 21/013 280/735 |
| 6,448,784 B1 * | 9/2002 | Belau | ................. | B60R 21/0173 307/10.1 |
| 8,463,501 B2 * | 6/2013 | Jousse | .................... | B60R 22/00 701/300 |
| 2004/0160045 A1 | 8/2004 | Miura | | |

\* cited by examiner

DRIVE ARRANGEMENT FOR DRIVING A VEHICLE SAFETY DEVICE

CROSS REFERENCE TO RELATED APPLICATIONS

This application claims priority to PCT International Patent Application No. PCT/GB2012/052044, filed on Aug. 21, 2012.

FIELD OF THE INVENTION

The present invention relates to a drive arrangement and more particularly relates to a drive arrangement for driving a vehicle safety device.

BACKGROUND OF THE INVENTION

A vehicle safety system typically incorporates crash sensors and safety devices which are connected to an electronic control unit. The electronic control unit receives signals from the sensors and processes the signals to determine whether the signals indicate a crash situation. If the electronic control unit determines that a crash situation is occurring then the electronic control unit provides an output signal to at least one of the safety devices to activate the safety device.

Many safety devices, such as airbag modules, incorporate a pyrotechnic squib. One output of the electronic control unit is connected to deliver a firing signal to the pyrotechnic squib to activate the squib in the event of a crash situation. The firing signal has suitable characteristics to activate the pyrotechnic squib and is usually in the form of a current of 1.2 A which flows for 2 ms or a current of 1.75 A that flows for 0.5 ms. The current in the firing signal is above a predetermined level which is required to trigger the pyrotechnic squib to activate the safety device. An electronic control unit will usually incorporate a plurality of outputs to drive a plurality of pyrotechnic squibs positioned in different safety devices in a vehicle.

The firing signals which are provided by the electronic control unit are suitable for activating a pyrotechnic squib. However, the firing signals are usually not suitable for triggering other vehicle safety devices which do not incorporate a pyrotechnic squib. Such safety devices could, for instance, include a fuel cut off device or a device for unlocking the doors of a vehicle.

Some electronic control units incorporate a crash output which is provided to trigger vehicle safety devices which do not incorporate a pyrotechnic squib. The crash output provides a signal having an appropriate current and voltage level and an appropriate signal coding to trigger a vehicle safety device. A crash output from an electronic control unit is an effective trigger for a vehicle safety device which does not incorporate a pyrotechnic squib. However, not all electronic control units incorporate a crash output because the crash output is sometimes omitted to reduce costs.

Even if a crash output is provided on an electronic control unit, the crash output can be problematic because there is no established standard that the crash output must follow. Therefore, a system designer must match a particular safety device with a particular crash output in order for the system to function correctly. This minimises the choice available to a system designer and can increase the cost if the designer is required to customise a system to match a particular crash output.

It has been proposed previously to connect an electronic control unit to a vehicle's controller area network (CAN) bus and to connect a safety device to the CAN bus so that the electronic control unit can trigger the safety device via the CAN bus. This enables a safety device that does not incorporate a pyrotechnic squib to be triggered by the electronic control unit. However, there are problems with this arrangement since a CAN bus usually extends throughout a vehicle and can become damaged during a crash situation. The damage may prevent the signal from the electronic control unit being conveyed to the safety device. Furthermore, there is no established standard that activation signals on a CAN bus must follow and so a system designer is limited to using proprietary hardware and software to trigger a safety device via a vehicle's CAN bus.

The present invention seeks to provide an improved drive arrangement for driving a vehicle safety device.

SUMMARY AND INTRODUCTORY DESCRIPTION OF THE INVENTION

According to the present invention, there is provided a drive arrangement for driving a vehicle safety device, the arrangement comprising an input operable to receive a firing signal, the firing signal being suitable for activating a pyrotechnic squib, a first analyser operable to perform a first algorithm on the firing signal and to provide a first determination that the firing signal would have activated the pyrotechnic squib, a second analyser operable to perform a second algorithm on the firing signal and to provide a second determination that the firing signal would have activated the pyrotechnic squib, an output connected to the first and second analysers, the output providing an output signal if both the first and second analysers determine that the firing signal would have activated the pyrotechnic squib, the output signal being suitable for activating a vehicle safety device.

Preferably, the input is connected to an output of an electronic control unit, the output of the electronic control unit being operable to provide the firing signal which is suitable for activating a pyrotechnic squib.

Conveniently, the electronic control unit comprises a first processor and a second processor which are each configured to receive a crash signal from a respective one of two crash sensors, wherein the processors are each operable to provide a confirmation signal in the event that the crash sensors sense a crash situation, the outputs of the processors being connected to a logic circuit which is operable to output the firing signal if both the processors provide confirmation signals indicative of a crash situation.

Advantageously, the electronic control unit comprises a further output which is connected to a pyrotechnic squib in a vehicle safety device.

Preferably, the firing signal provided by the electronic control unit at the output which is connected to the input of the drive arrangement is substantially the same as the firing signal provided by the electronic control unit at the further output which is connected to the pyrotechnic squib.

Conveniently, the input comprises two terminals and first and second resistors connected in series between the terminals.

Advantageously, the first analyser comprises a current sensor to sense the current flowing through the first resistor when the input receives the firing signal, the first analyser being operable to analyse the current flowing through the first resistor and to provide the first determination if the current is above a predetermined threshold.

Preferably, the second analyser comprises a current sensor to sense the current flowing through the second resistor when the input receives the firing signal, the second analyser being operable to analyse the current flowing through the second resistor and to provide the second determination if the current is above a predetermined threshold.

Conveniently, the firing signal comprises a current which is above a predetermined threshold and which flows for a predetermined length of time.

Advantageously, the current of the firing signal is between 1 A and 2 A and the current flows for a duration of between 0.5 ms and 2 ms.

In one embodiment, the current of the firing signal is 1.2 A and the current flows for 2 ms.

In another embodiment, the current of the firing signal is 1.75 A and the current flows for 0.5 ms.

Advantageously, the arrangement further comprises a test signal source which is connected to provide a test signal to the input, the test signal being equivalent to the firing signal which is suitable for activating the pyrotechnic squib, the arrangement further comprising a logic circuit which is activated when the test signal is provided to the input, the logic circuit being operable to prevent the output from providing the output signal when both the first and second analysers determine that the test signal would have activated the pyrotechnic squib.

Preferably, the output is connected to at least one pyrotechnic squib in a vehicle safety device.

Conveniently, the arrangement is operable to provide a diagnostic signal to each pyrotechnic squib and to analyse the diagnostic signals passing through each pyrotechnic squib to determine the health of each pyrotechnic squib.

BRIEF DESCRIPTION OF THE DRAWINGS

In order that the invention may be more readily understood, and so that further features thereof may be appreciated, embodiments of the invention will now be described, by way of example, with reference to the accompanying drawings in which.

DETAILED DESCRIPTION OF THE INVENTION

Figure 1:
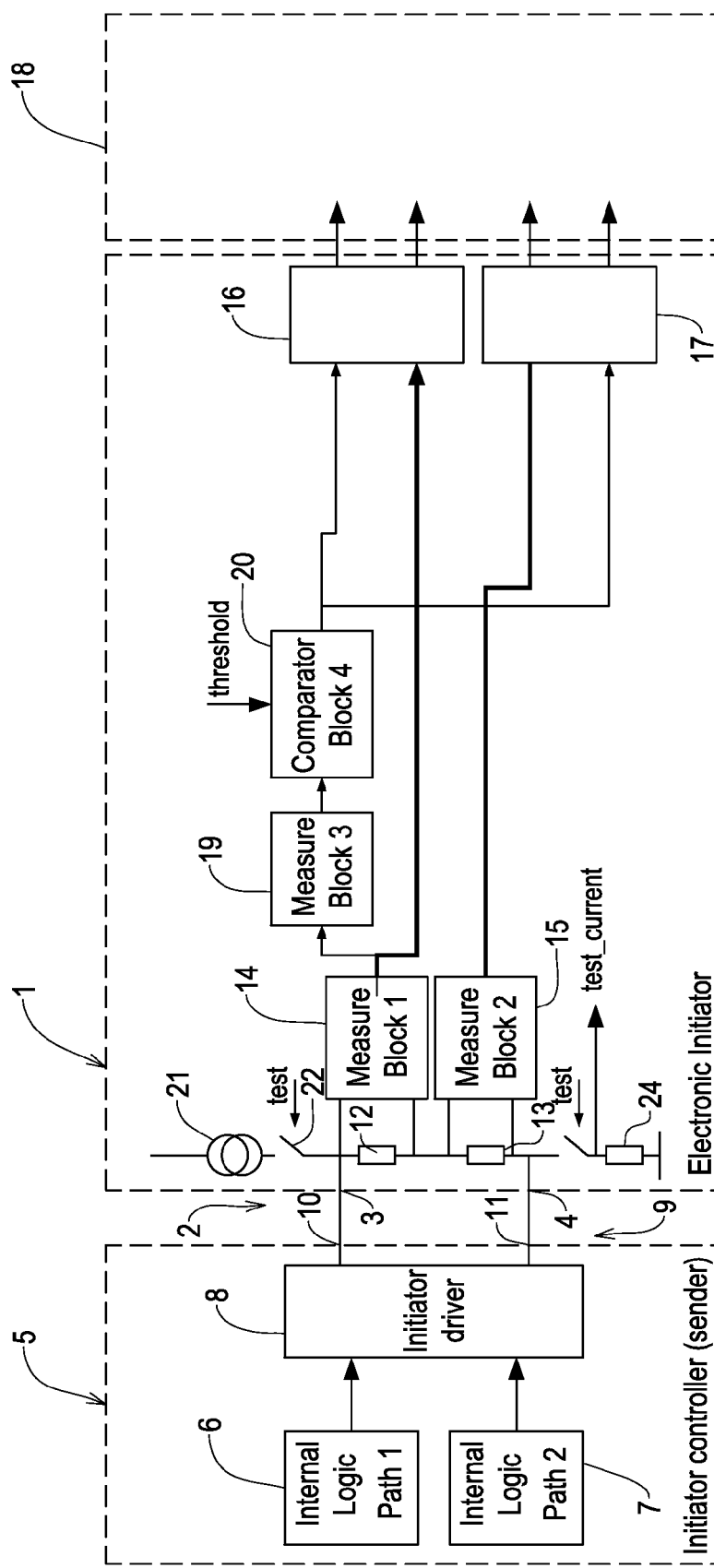
FIG. 1 is schematic diagram of a drive arrangement of a preferred embodiment of the invention.

Referring initially to FIG. 1 of the accompanying drawings, a drive arrangement 1 of a preferred embodiment of the invention incorporates an input 2 which comprises a first input terminal 3 and a second input terminal 4. The input 2 is, in use, connected to an electronic control unit 5 which is operable to detect a crash situation.

The electronic control unit 5 is connected to at least two crash sensors (not shown). One crash sensor is connected to a first processor 6 (Internal Logic Path 1) and the other crash sensor is connected to a second processor 7 (Internal Logic Path 2). The first and second processors 6, 7 provide two separate logic paths to a pyrotechnic squib driver 8 (Initiator driver). The pyrotechnic squib driver 8 is connected to an output 9 which comprises a first output terminal 10 and a second output terminal 11. The output 9 would normally be connected to a safety device, such as an airbag module, which incorporates a pyrotechnic squib actuator. However, in an embodiment of the invention, the first and second output terminals 10, 11 are connected respectively to the first and second input terminals 3, 4 of the drive arrangement 1.

The two separate processors 6, 7 in the electronic control unit 5 process signals from the two crash sensors in parallel with one another. The pyrotechnic squib driver 8 is operable to provide a pyrotechnic squib firing signal at the output 9 if both the first and second processors 6, 7 determine that both sensors detect that a crash situation is occurring. The two separate logic paths provided by the processors 6, 7 improve the accuracy of the crash detection arrangement since the pyrotechnic squib driver 8 only outputs the firing signal if both paths in the detection arrangement detect that a crash situation is occurring. The dual paths help to minimise false activation of a pyrotechnic squib if, for instance, one sensor provides a false indication that a crash situation is occurring.

The firing signal provided at the output 9 of the electronic control unit 5 is a signal which would activate a pyrotechnic squib if a pyrotechnic squib were to be connected to the output 9. The firing signal preferably comprises a current of between 1 A and 2 A which flows for a duration of between 0.5 ms and 2 ms. In one embodiment, the firing signal comprises a current of 1.2 A which flows for 2 ms. In another embodiment, the firing signal comprises a current of 1.75 A which flows for 0.5 ms.

The output 9 of the electronic control unit 5 is an output which would usually be connected to a pyrotechnic squib in a vehicle safety device. However, in an embodiment of the invention, the output 9 is connected to the input 2 of the drive arrangement 1 which does not incorporate a pyrotechnic squib but instead incorporates an arrangement for detecting the firing signal provided by the electronic control unit 5. In another embodiment, the electronic control unit 5 incorporates a further output (not shown) which is connected to a pyrotechnic squib in a vehicle safety device. A firing signal provided by the control unit 5 at the further output is substantially the same as a firing signal provided by the electronic control unit 5 at the output 9 which is connected to the drive arrangement 1. The firing signals provided at the output and the further output of the control unit 5 are substantially the same in the sense that the firing signals are interchangeable with one another. A pyrotechnic squib connected to either the output or the further output of the control unit 5 would be activated by a firing signal provided by the control unit 5 at that output.

The drive arrangement 1 incorporates first and second sense resistors 12, 13 which are connected in series with one another between the first and second input terminals 3, 4. The resistors 12, 13 together form a resistive load which emulates the resistance of a pyrotechnic squib which would normally be connected to the output 9 of the control unit 5.

A first analyser 14 (Measure Block 1) is connected across the first resistor 12 to measure the voltage across the first resistor 12. The first analyser 14 is operable to sense the current flowing through the first resistor 12 when the electronic control unit 5 provides a firing signal to the input 2. The first analyser 14 is operable to perform a first algorithm on the sensed current from the firing signal. The first analyser 14 provides a first determination that the firing signal would have activated a pyrotechnic squib if the sensed current is above a predetermined level and the sensed current flows for at least a predetermined length of time. The method by which the first analyser 14 provides the first determination is discussed in more detail below.

A second analyser 15 (Measure Block 2) is connected across the second resister 13 to sense the current flowing through the second resistor 13 when the electronic control unit 5 provides a firing signal to the input 2. The second analyser 15 is operable to perform a second algorithm on the sensed current of the firing signal. The second analyser 15 provides a second determination that the firing signal would have activated a pyrotechnic squib if the sensed current is above a predetermined level and the sensed current flows for at least a predetermined length of time. The method by which the second analyser 15 provides the second determination is discussed in more detail below.

The outputs of the first and second analysers 14, 15 are connected respectively to the first and second output control units 16, 17. The output control units 16, 17 are connected to a safety device 18 which, in one embodiment, comprises a pyrotechnic squib actuator. The output control units 16, 17 are operable to provide an output activation signal to the safety device 18 in the event that both the first and second analysers 14, 15 determine that the firing signal delivered to the input 2 would have activated a pyrotechnic squib. If the output control units 16, 17 receive a positive determination from both the first and second analysers 14, 15 then the output control units 16, 17 output an activation signal to the safety device 18. In the embodiment where the safety device 18 incorporates a pyrotechnic squib, the output signal provided by the output control unit 16, 17 is a firing signal which is suitable for activating the pyrotechnic squib.

The first and second analysers 14, 15 and the first and second resistors, 12, 13 together form a dual path sensing arrangement to sense a firing signal provided at the input 2. The two sensing and analysing paths improve the robustness of the sensing arrangement to minimise the chance of the drive arrangement activating the safety device 18 when, in fact, no firing signal was provided at the input 2.

In one embodiment, the drive arrangement 1 incorporates a diagnostic signal measurement unit 19 (Measure Block 3) and a diagnostic comparator 20 (Comparator Block 4). The diagnostic signal measurement unit 19 is connected to the output of the first analyser 14 to monitor the signal provided at the output. The diagnostic comparator 20 compares the measured signal with a predetermined threshold value. If the sensed signal is below the predetermined threshold value then the diagnostic comparator 20 outputs diagnostic pulses to the first and second output control units 16, 17. The diagnostic comparator 20 can thus detect when the output signal from the first analyser 14 is indicative of a diagnostic signal being provided by the electronic control unit 5 to the input 2.

A diagnostic signal provided by the electronic control unit 5 is usually passed through a pyrotechnic squib to check the health of the pyrotechnic squib. The diagnostic signal is a signal comprising a current, such as a current of 40 mA, which is too low to activate a pyrotechnic squib. If the diagnostic comparator 20 determines that the signal applied at the input 2 is a diagnostic signal then the diagnostic comparator 20 provides diagnostic pulses to the first and second output units 16, 17 to trigger the output units 16, 17 to provide a diagnostic signal to a pyrotechnic squib in the safety device 18. The output control units 16, 17 provide the diagnostic signal to the pyrotechnic squib to sense the health of the pyrotechnic squib.

In a further embodiment of the invention, the drive arrangement 1 incorporates a test signal source in the form of a current source 21 which is connected via a first test switch 22 to the first input terminal 3. In this embodiment, a second test switch 23 is connected to the second input terminal 4 and a test resistor 24 is connected between the second test switch 23 and ground. The test current source 21, the test switches 22, 23 and the test resistor 24 together provide a test arrangement for providing a test firing signal to the input terminals 3, 4. The operation of this test arrangement is discussed in more detail below.

Figure 2:
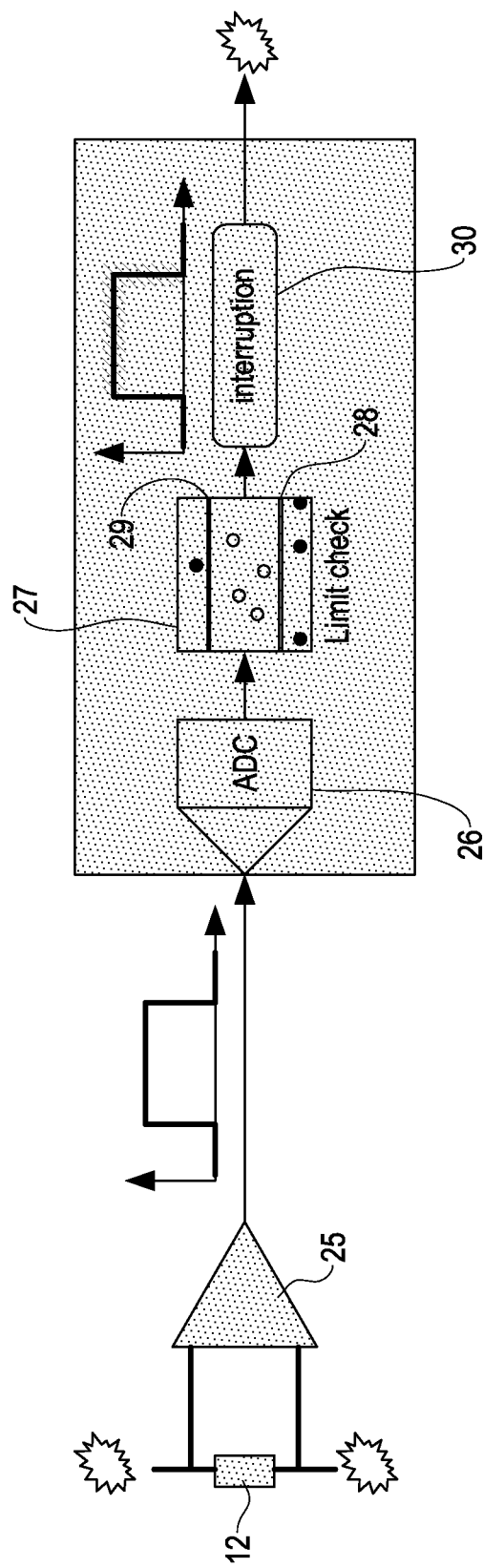
FIG. 2 is a schematic diagram illustrating a first method of detecting a firing signal.
Figure 3A:
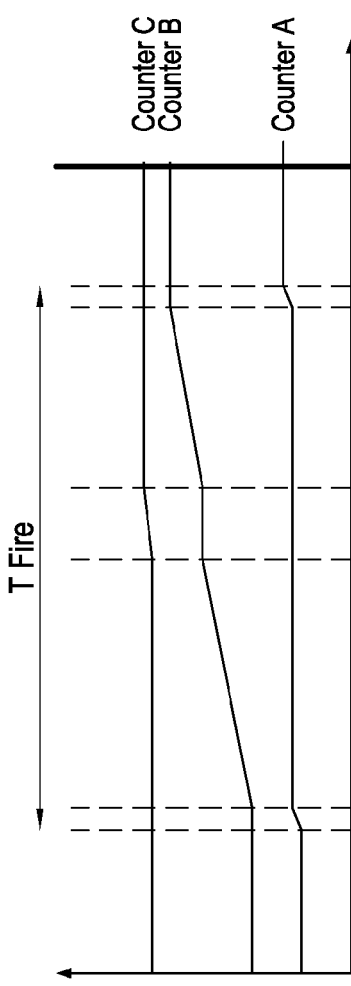
FIG. 3a is a graphical representation of the value of three counters used in the first method of detecting the firing signal.
Figure 3B:
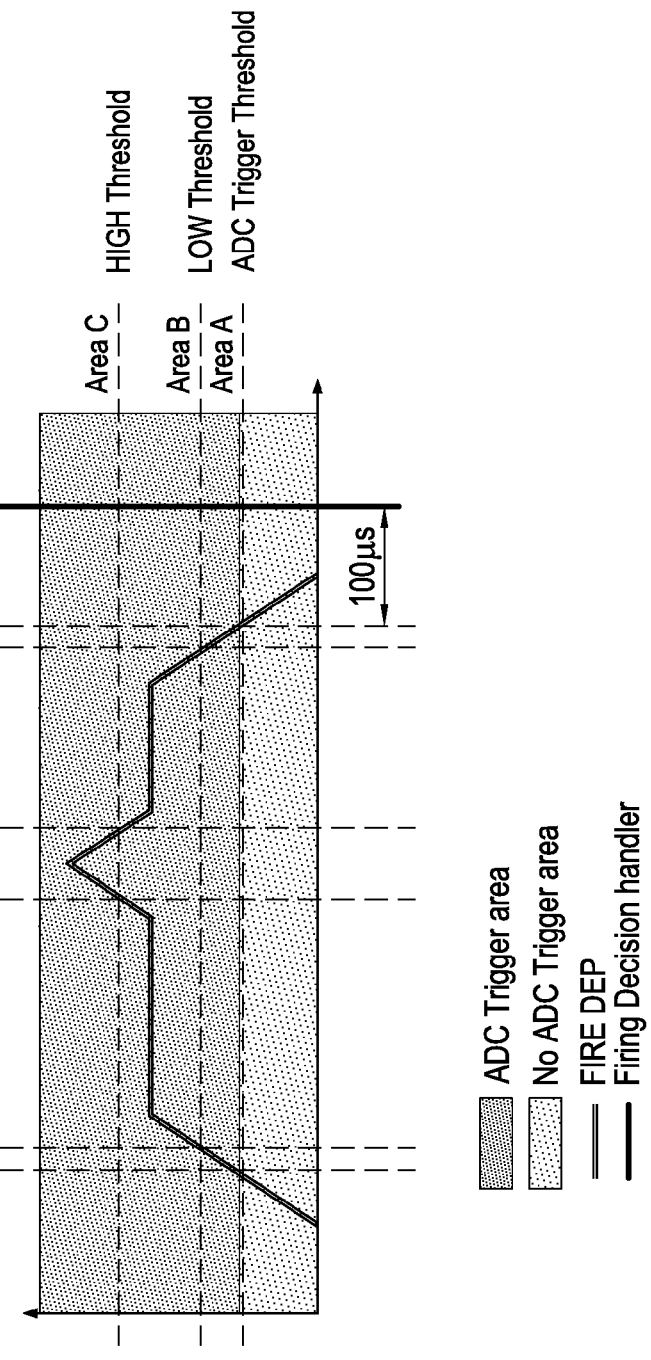
FIG. 3b is a graphical representation of three thresholds used in the first method of detecting the firing signal.
Figure 4:
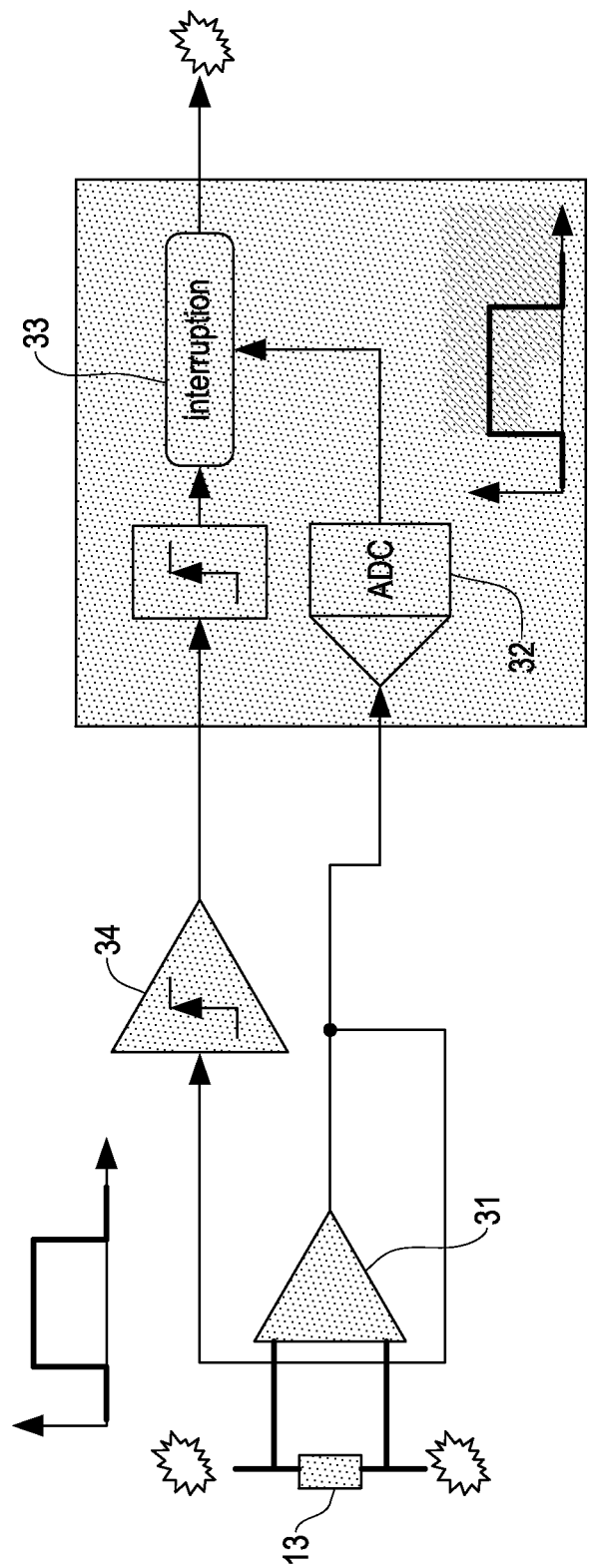
FIG. 4 is a schematic diagram illustrating a second method of detecting a firing signal.

The first measurement method employed by the first analyser 14 will now be described with reference to FIGS. 2, 3a and 3b. The first analyser 14 incorporates a shunt current monitor 25 which provides an output signal which is indicative of the current flowing through the first resistor 12. The first analyser 14 comprises an analogue to digital converter 26 which converts the analogue current level into a digital value. The digital value is input into a limit check device 27 which checks whether the digital value is between a lower threshold 28 and an upper threshold 29. The digital values are represented as circles in the limit check device 27 shown in FIG. 2. The limit check device 27 outputs an interruption signal 30 as long as the digitised signal is between the upper and lower thresholds 28, 29.

The first analyser 14 is operable to apply an algorithm to the digital value provided by the analogue to digital converter 26 whenever the limit check device 27 generates the interruption signal 30. The algorithm compares the digital value with a low threshold and a high threshold and records the number of samples captured in areas A, B and C, as shown in FIG. 3b. The algorithm captures the samples using three separate counters which count when the digital value falls within one of the three areas A, B or C. The count value in each counter or each area A, B and C is shown in FIG. 3a.

The algorithm detects the falling edge of the signal and detects when the signal falls below the trigger threshold. The device starts a timer when the signal drops below the trigger threshold and waits for a period of time, which is preferably 100 μs, before recording the values in each of the three counters. The algorithm determines whether the analyser 14 detects a valid firing signal by comparing the values in the three counters with predetermined thresholds.

If the counter for area A exceeds a predetermined threshold then the firing signal detection is considered invalid since the average amplitude of the digital signals is too low which is indicative of a signal which is too low to be a firing signal.

If the counter for area C has exceeded a predetermined threshold then the signal is considered not to be a firing signal since the average digital signal value is too high for the signal to be in a range suitable for use as a firing signal.

If the sum of the counters for areas A, B and C is below a predetermined threshold then the signal is not considered to be a valid firing signal since the total duration of the signal is too short to be a valid firing signal.

If the sum of the counters A, B and C is above a predetermined threshold then the signal is not considered to be a valid firing signal since the total duration of the signal is too long to be a firing signal.

If none of the above counter requirements are determined then the signal is considered to be a valid firing signal and the first analyser 14 provides a first determination that the firing signal would have activated a pyrotechnic squib.

The algorithm used in this first sensing method provides a robust detection of a valid firing signal. The algorithm and the counters allow the first analyser 14 to tolerate an altered and/or oscillating firing signal which may arise due to an inductive component in the circuit.

A second method for detecting a valid firing signal will now be described with reference to FIGS. 4, 5, 6a and 6b. This second method is the method used by the second analyser 15. The second method is different from the first method used by the first analyser 14 so that different methods are used to detect a valid firing signal applied at the input 2.

The second analyser 15 incorporates a shunt current monitor 31 which senses the current flowing through the second resistor 13 when a signal is applied at the input 2. The output of the shunt current monitor 31 is fed into an analogue to digital converter 32 which converts the measured current into a digital value. The second analyser 15 generates an interruption 33 when the digital value representing the current flowing through the second resistor 13 is above a predetermined threshold. The second analyser 15 further comprises an operational unit 34 which is connected to the output of the current shunt monitor and repeatedly compares the sensor current with a predetermined threshold.

Figure 5:
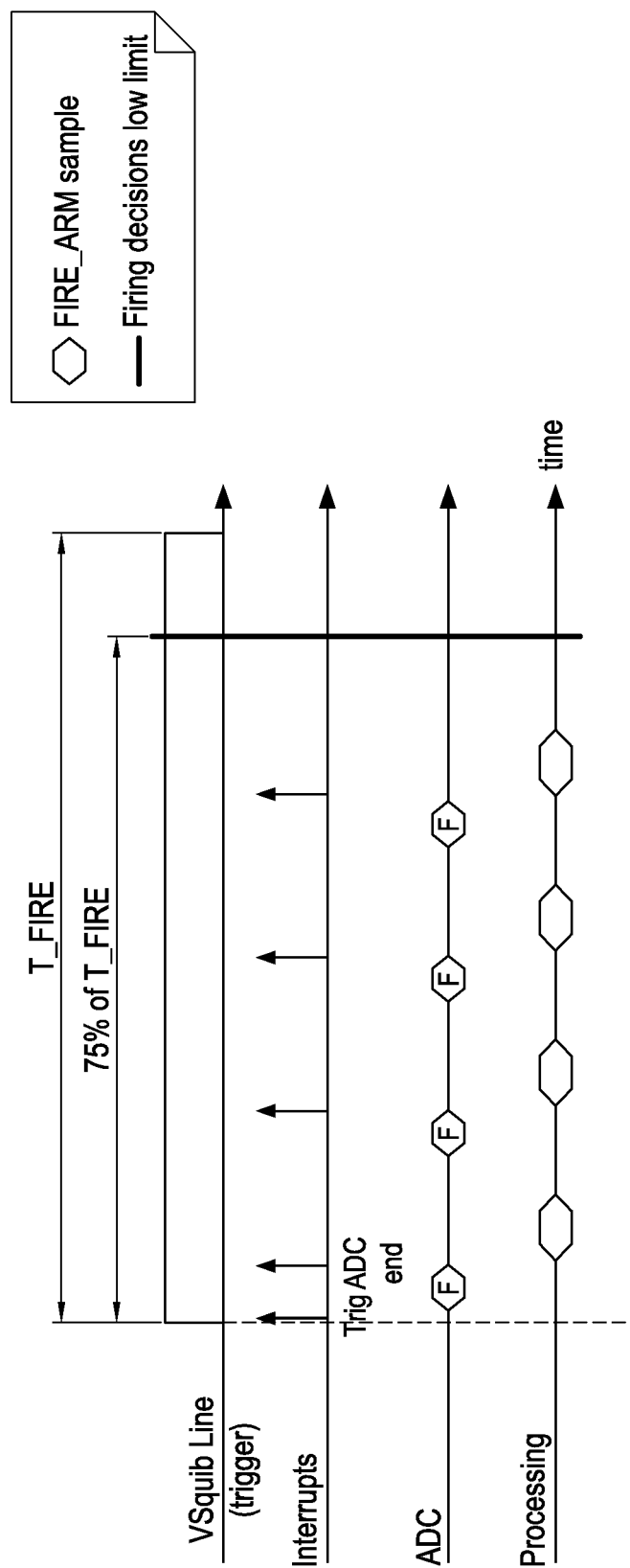
FIG. 5 is a schematic diagram illustrating a sequence of measurements taken during the second method of detecting the firing signal.
Figure 6B:
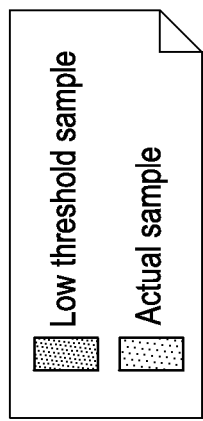
FIG. 6b is a graphical representation corresponding to FIG. 6a showing the accumulation of samples during the second method of detecting the firing signal.
Figure 6B:
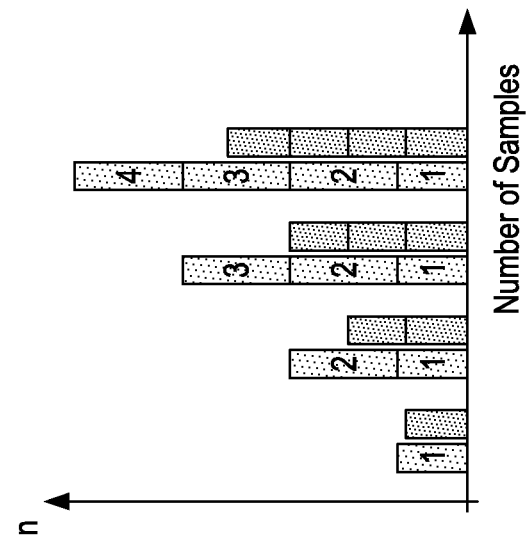
Figure 6A:
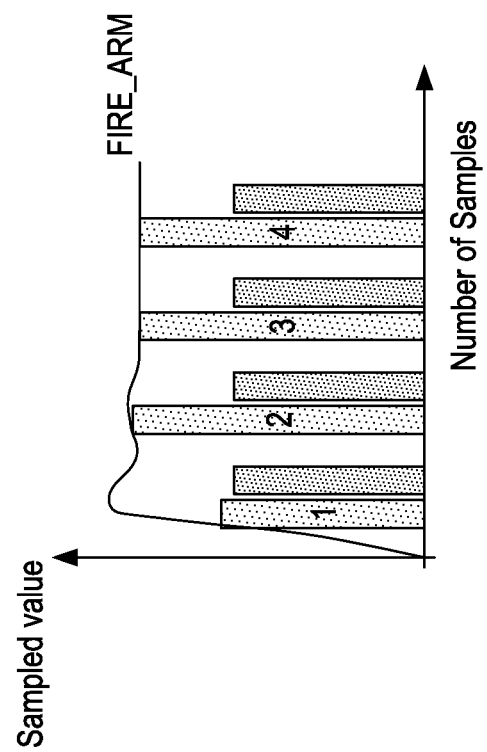
FIG. 6a is a graphical representation of samples accumulated during the second method of detecting the firing signal.

FIG. 5 illustrates the typical sequence of measurements taken during the second method and FIGS. 6a and 6b show how consecutively collected samples of the digital value are integrated. The digital value is gradually accumulated and compared with a predetermined threshold. If the accumulated value exceeds the predetermined threshold then the method determines that sufficient energy has been dissipated by the second resistor 13 to activate a pyrotechnic squib if a pyrotechnic squib were to be connected at the input 2. The second method considers this to be a signal indicative of a valid firing signal.

Figure 7:
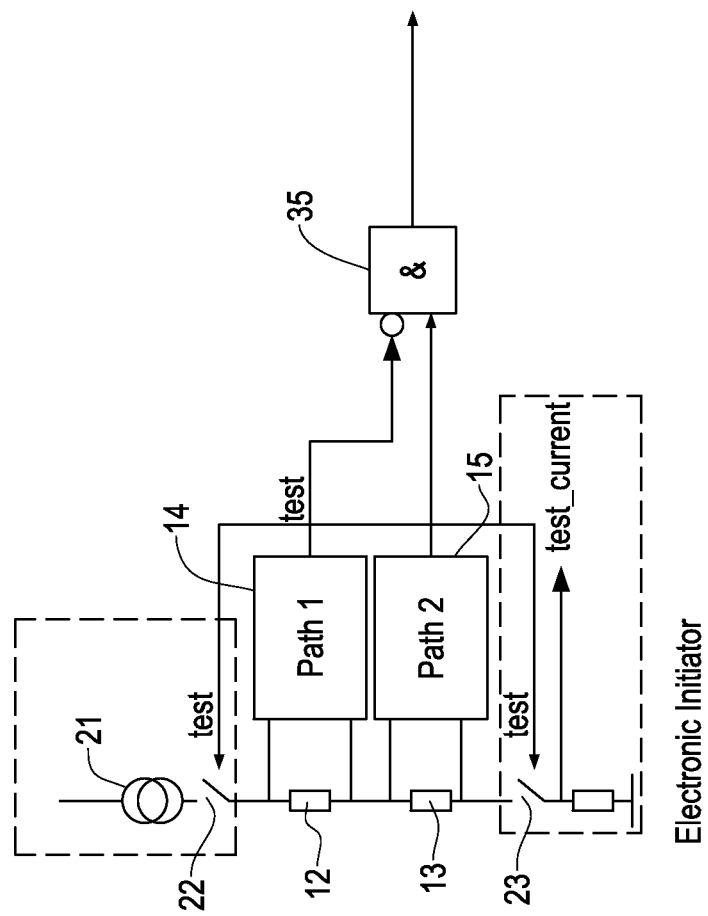
FIG. 7 is a schematic diagram of a further embodiment of the invention which incorporates a fault detection arrangement.

Referring now to FIG. 7 of the accompanying drawings, the operation of the test current source and switches 22,23 will now be described. Embodiments incorporating the test current source and switches 22,23 further incorporate a logic gate 35 which is preferably a NAND gate. The NAND gate 35 has two inputs which are connected respectfully to the outputs of the first and second analysers 14, 15.

The drive arrangement enters a test mode by closing the test switches 22, 23 so that current from the test current source 21 flows through the first and second resistors 12, 13 in a similar manner to a firing signal provided by the electronic control unit 5. In this test mode, the drive arrangement 1 activates the NAND gate 35 so that positive first and second determinations provided at the outputs of the first and second analysers 14, 15 do not activate a safety device connected to the output control units 16, 17. This test mode can therefore be used to simulate application of a valid firing signal to the input 2 in order to test the two detection paths of the first and second analysers 14, 15. The drive arrangement can therefore test itself to ensure that the first and second analysers 14, 15 are functioning correctly.

Once the test has completed, the test switches 22, 23 are disconnected and the NAND gate 35 is deactivated so that a valid firing signal provided by the electronic control unit 5 can activate the safety device 18.

While the above description constitutes the preferred embodiment of the present invention, it will be appreciated that the invention is susceptible to modification, variation and change without departing from the proper scope and fair meaning of the accompanying claims.

The invention claimed is:

1. A drive arrangement for driving a vehicle safety device, the arrangement comprising:
   an input operable to receive a firing signal, the firing signal being suitable for activating a pyrotechnic squib;
   a first analyser operable to perform a first algorithm on the firing signal and to provide a first determination that the firing signal would have activated the pyrotechnic squib, the first determination being based on a plurality of counters of firing signal values;
   a second analyser operable to perform a second algorithm on the firing signal different than the first algorithm and to provide a second determination that the firing signal would have activated the pyrotechnic squib, the second determination being based on an integral of the firing signal values over time;
   a drive arrangement output connected to the first and the second analysers, the drive arrangement output providing an output signal if both the first and the second analysers determine that the firing signal would have activated the pyrotechnic squib, the drive arrangement output signal being suitable for activating the vehicle safety device.

2. The drive arrangement according to claim 1, wherein the input is configured to be connected to an output of an electronic control unit operable to provide the firing signal.

3. The drive arrangement according to claim 2, wherein the electronic control unit comprises a first processor and a second processor which are each configured to receive a crash signal from a respective one of two crash sensors, wherein the first and the second processors are each operable to provide a confirmation signal in the event that the crash sensors sense a crash situation, the outputs of the first and the second processors being connected to a logic circuit which is operable to output the firing signal if both the processors provide the confirmation signals indicative of the crash situation.

4. The drive arrangement according to claim 2, wherein the electronic control unit comprises a further output which is connected to the pyrotechnic squib in the vehicle safety device.

5. The drive arrangement according to claim 4, wherein the firing signal provided by the electronic control unit at the output of the electronic control unit which is connected to the input of the drive arrangement is substantially the same as the firing signal provided by the electronic control unit at the further output which is connected to the pyrotechnic squib.

6. The drive arrangement according to any claim 1, wherein the input comprises two terminals and a first and a second resistor connected in series between the terminals.

7. The drive arrangement according to claim 6, wherein the first analyser comprises a first current sensor to sense the current flowing through the first resistor when the input receives the firing signal, the first analyser being operable to analyse the current flowing through the first resistor and to provide the first determination if the current is above a predetermined threshold.

8. The drive arrangement according to claim 6, wherein the second analyser comprises a second current sensor to sense the current flowing through the second resistor when the input receives the firing signal, the second analyser being operable to analyse the current flowing through the second resistor and to provide the second determination if the current is above a predetermined threshold.

9. The drive arrangement according to claim 1, wherein the firing signal comprises a current which is above a predetermined threshold and which flows for a predetermined length of time.

10. The drive arrangement according to claim 9, wherein the current of the firing signal is between 1 A and 2 A and the current flows for a duration of between 0.5 ms and 2 ms.

11. The drive arrangement according to claim 9, wherein the current of the firing signal is 1.2 A and the current flows for 2 ms.

12. The drive arrangement according to claim 9, wherein the current of the firing signal is 1.75 A and the current flows for 0.5 ms.

13. A drive arrangement for driving a vehicle safety device, the arrangement comprising:
  an input operable to receive a firing signal, the firing signal being suitable for activating a pyrotechnic squib;
  a first analyser operable to perform a first algorithm on the firing signal and to provide a first determination that the firing signal would have activated the pyrotechnic squib;
  a second analyser operable to perform a second algorithm on the firing signal and to provide a second determination that the firing signal would have activated the pyrotechnic squib;
  a drive arrangement output connected to the first and the second analysers, the drive arrangement output providing an output signal if both the first and the second analysers determine that the firing signal would have activated the pyrotechnic squib, the drive arrangement output signal being suitable for activating the vehicle safety device;
  a test signal source which is connected to provide a test signal to the input, the test signal being equivalent to the firing signal which is suitable for activating the pyrotechnic squib; and
  a logic circuit which is activated when the test signal is provided to the input, the logic circuit being operable to prevent the output from providing the output signal when both the first and the second analysers determine that the test signal would have activated the pyrotechnic squib.

14. The drive arrangement according to claim wherein the output is configured to be connected to at least one pyrotechnic squib in a vehicle safety device.

15. A drive arrangement for driving a vehicle safety device, the arrangement comprising:
  an input operable to receive a firing signal, the firing signal being suitable for activating a pyrotechnic squib;
  a first analyser operable to perform a first algorithm on the firing signal and to provide a first determination that the firing signal would have activated the pyrotechnic squib;
  a second analyser operable to perform a second algorithm on the firing signal and to provide a second determination that the firing signal would have activated the pyrotechnic squib;
  a drive arrangement output connected to the first and the second analysers, the drive arrangement output providing an output signal if both the first and the second analysers determine that the firing signal would have activated the pyrotechnic squib, the drive arrangement output signal being suitable for activating the vehicle safety device;
  wherein the output is connected to at least one pyrotechnic squib in a vehicle safety device;
  wherein the arrangement is operable to provide a diagnostic signal to the pyrotechnic squib and to analyse the diagnostic signals passing through the pyrotechnic squib to determine the health of each pyrotechnic squib.

16. The drive arrangement according to claim 15, wherein the diagnostic signal is too low to activate the pyrotechnic squib.

17. The drive arrangement according to claim 15, wherein the diagnostic signal is connected with a diagnostic comparator which upon determining the occurrence of the diagnostic signal provides diagnostic pulses to an output control unit which provides a second diagnostic signal to the pyrotechnic squib.

* * * * *